(12) United States Patent
Saunders et al.

(10) Patent No.: US 7,099,597 B2
(45) Date of Patent: Aug. 29, 2006

(54) METHOD OF ADAPTIVE SIGNAL DEGRADATION COMPENSATION

(75) Inventors: Ross Alexander Saunders, Ottawa (CA); Rajkumar Nagarajan, Ottawa (CA); Hanan Anis, Kanata (CA); Andrew Robinson, Ottawa (CA); Sacha Corbeil, Kanata (CA)

(73) Assignee: PTS Corporation, San Jose, CA (US)

( * ) Notice: Subject to any disclaimer, the term of this patent is extended or adjusted under 35 U.S.C. 154(b) by 591 days.

(21) Appl. No.: 09/927,680

(22) Filed: Aug. 10, 2001

(65) Prior Publication Data

US 2002/0039217 A1    Apr. 4, 2002

Related U.S. Application Data

(60) Provisional application No. 60/227,796, filed on Aug. 25, 2000.

(51) Int. Cl.
*H04B 10/04*    (2006.01)

(52) U.S. Cl. .................. 398/193; 398/147; 398/194

(58) Field of Classification Search ............... 398/29, 398/50, 81, 147, 159, 193, 194
See application file for complete search history.

(56) References Cited

U.S. PATENT DOCUMENTS

| | | | | |
|---|---|---|---|---|
| 4,953,939 | A | | 9/1990 | Epworth .................. 398/147 |
| 4,969,710 | A | | 11/1990 | Tick et al. ................ 385/123 |
| 5,373,382 | A | | 12/1994 | Pirio et al. ............... 398/185 |
| 5,627,925 | A | * | 5/1997 | Alferness et al. ............ 385/17 |
| 5,717,510 | A | * | 2/1998 | Ishikawa et al. ........... 398/199 |
| 5,917,637 | A | * | 6/1999 | Ishikawa et al. ........... 398/197 |
| 6,433,904 | B1 | * | 8/2002 | Swanson et al. ............ 398/91 |

FOREIGN PATENT DOCUMENTS

| | | |
|---|---|---|
| EP | 0 849 897 | 6/1998 |
| EP | 0 917 311 | 5/1999 |
| EP | 0 980 155 A1 | 2/2000 |

OTHER PUBLICATIONS

ITU-T G.975, "Forward Error Correction for Submarine Systems" Nov. 1996.
Saito et al., "Prechirp Technique for Dispersion Compensation for a High-Speed Long Span Transmission" IEEE Photonics Technology Letters, vol. 3, No. 1., Jan. 1991.

(Continued)

*Primary Examiner*—Christina Y Leung

(57) ABSTRACT

An iterative process is used to set the phase prechirp of a WDM optical transport system to a system's optimal level that maximizes the signal quality. A signal degradation factor takes into account linear and non-linear effects along the optical path and is used as a receive end feedback signal to control the phase prechirp level at the transmitter site. By using the FEC corrected errors rate as the feedback signal, optimization of signal quality is performed even when the system is running error free. By using an adaptive phase prechirp transmitter, signal degradation compensation can be also performed on a per wavelength basis to compensate for the residual dispersion slope and to allow optimization of individual channels independently of the net link dispersion value.

This method provides more flexibility when using optical switching in core networks, as it allows path optimization to new physical link connectivity, without requiring any change to the optical components such that, significant signal degradation tuning range for a WDM optical transport system is provided.

26 Claims, 6 Drawing Sheets

OTHER PUBLICATIONS

Gnauck et al., "Dispersion Penalty Reduction Using an Optical Modulator with Adjustable Chirp" IEEE Photonics Technology Letters, vol. 3, No. 10, Oct. 1991.

Fernando et al., Look-up Table based Adaptive Predistortion for Dynamic Range Enhancement in a Radio over Fiber Link, IEEE, Aug. 22, 1999, vol. Conf. 7, pp. 26-29.

Shimojoh et al., 640 Gbit/s (64×10 Gbit/s) WDM transmission over 10,127 km using L-band EDFAs, Electronic Letters, Jan. 20, 2000, vol. 36, No. 2, pp. 155-156.

Agrwal, Govind P., "Optical Pulse Compression", Nonlinear Fiber Optics, Academic Press, Second Edition, 1995, pp. 201-237.

* cited by examiner

METHOD OF ADAPTIVE SIGNAL DEGRADATION COMPENSATION

CROSS REFERENCE TO RELATED APPLICATIONS

This application claims the benefit of U.S. patent application Ser. No. 60/227,796 filed Aug. 25, 2000.

BACKGROUND OF THE INVENTION

The invention relates generally to optical transport systems and more particularly to an optical fiber transmission system with an adaptive phase prechirp transmitter.

Optical networks are presently the physical medium of choice and maximizing their performance is a constant need. The universal access to communications created by the introduction of Internet has driven the demand for more high-bandwidth networks capable of handling large volumes of data at high speed and low latency.

A Composite Signal Degradation Factor

For transmitting data over an optical network, the information is encoded into a series of pulses, or bits. As the signal propagates over the physical fiber, degradations of the signal tend to accumulate with distance and can make a pulse unrecognizable above the ambient noise level in the optical channel. Such degradations in signal quality can cause bits to be misinterpreted at the receiving end, thereby increasing the bit error rate (BER).

Signal degradation is due to factors like dispersion, chirped lasers, chirped external modulators, just to enumerate a few. Dispersion, or pulse broadening, is the main contributor to signal degradation. By broadening the pulses, this phenomenon causes inter symbol interference (ISI) where widened pulses encroach on time slots of neighbouring pulses.

The phenomenon of group velocity dispersion (GVD), e.g. chromatic dispersion (CD) and polarization mode dispersion (PMD), as well as fiber non-linearities, e.g. the self-phase modulation (SPM), are significant obstacles to achieving quality communication standards over longer repeaterless transmission distances.

Dispersion causes pulse broadening due to the fact that different optical wavelengths travel at different speeds within a fiber depending on the fiber parameters. Chromatic dispersion (CD) is a signal degradation effect which increases linearly with the length of the optical path. Chromatic dispersion (CD) can be also viewed as variations in the propagation constant of the fiber in respect to the frequency.

With the advent of optical amplification, modern transport networks generally operate in the 1,540 nm window of silica fiber, while the low-dispersion window is at 1,310 nm. However, most of optical fiber transmission lines presently laid are 1,310 nm, low-dispersion, single mode fibers (SMF). The effect of dispersion can be reduced if special fibers with minimal dispersion characteristics shifted from the 1,310 nm window to 1,540 nm window are employed. Such fibers are referred to as dispersion shifted fibers (DSF). However, even for DSF, the accumulated dispersion across the wavelength band at 1,000 km reach is far beyond a 10 Gbps receiver dispersion tolerance.

PMD causes pulse broadening because the two orthogonal polarization modes of the light travel at different speeds along a fiber. This is mainly due to the ellipticity of the fiber core. In addition, the distribution of signal energy over the different states of polarization (SOP) changes with time, due to changes in ambient conditions, e.g. temperature changes, and thus the PMD penalty varies with time as well. For example, the differential time delay between the two orthogonal SOPs on a link is usually between 0.5 and 2.0 ps/$\sqrt{km}$, and may vary over the bandwidth of a source.

The optical signal is also degraded by the Kerr effect which is a non-linear effect of the optical transmission medium, representing the increase of the index of refraction of the fiber with the intensity (I) of the optical signal. The changes of this index modulate the phase of the optical signal passing through the fiber and thus, re-distributes the signal frequency spectrum. Self-phase modulation (SPM) is characteristic for systems where the optical signal modulates itself, and the resulting changes in frequency distribution are translated into amplitude modulation due to fiber dispersion.

The interplay between CD and non-linearities such as SPM, can lead to increased distortion as a function of transmission distance. The combined GVD-SPM effect for waveform degradation may be expressed as:

$$DB^2 P_{av} L^2 = \text{constant}, \quad \text{EQ1}$$

where D is the dispersion (ps/nm/km);

B is the bit transmission rate (bps);

$P_{av}$ is the average optical power (mW) in the transmission line; and

L is the transmission distance.

For example, if the transmission rate is increased from 10 Gbps to 40 Gbps, $P_{av}$ has to be increased 4-times, resulting in a reduction of the transmission distance of $\frac{1}{64}$ L for the same allowable dispersion (D).

It is known that some isotropic materials when they are under stress, e.g. mechanical forces, thermal forces, electrical fields, become anisotropic and may change the index of refraction in certain directions within the fiber material. Dispersion-compensating elements (DCE) having a negative induced dispersion coefficient, are typically introduced in the path of light to create negative dispersion to counteract the positive dispersion experienced in signal propagation through optical fibers.

A Dispersion Compensation technique usually implies use of successive lengths of fiber with positive and negative alternating dispersions, or dispersion slopes [S=dD/dλ) ], for controlling the dispersion phenomenon over a long span. The single mode (SM) optical fiber causes positive dispersion (D) at a rate of +17 pico seconds per kilometer per wavelength of light, or D=17 ps/(nm-km). If a SM fiber is alternated along a span with dispersion compensating fiber (DCF), having a negative dispersion value larger than the dispersion of the SM fiber, a small net link dispersion may be obtained for the entire connection. For example, fiber spans with high negative dispersion D=−68 ps/(nm-km) used in coils of ¼ L, are sufficient to compensate conventional SM fiber and to cause "back-to-zero", or dispersion equalization.

Large negative dispersion may be also introduced using chirped fiber Bragg gratings, Mach-Zender interferometers (MZI), Gires-Tournois interferometers (GTI), etc.

To maintain quality communications with higher bit rate signals, the optical signal-to-noise ratio (OSNR) must increase to overcome the effect of the ISI. Such increase in OSNR is often obtained by increasing the transmit power and is accounted as the "power penalty". The group velocity dispersion (GVD) limits the permissible link length (L) for a given power penalty. Moreover, when increasing the optical power, the self-phase modulation (SPM) effect increases as well.

Other non-linear phenomena in fiber are due to photons interaction with atoms which may result in atoms being excited to higher energy levels. When excited, atoms are not stable and tend to return to lower energy levels by releasing photons. These released photons propagate at a velocity that depends on their energy [W=f(λ)] and therefore, their wavelength is different from that of the originating photon.

The Chirp Parameter

As an almost monochromatic light-pulse travels trough a fiber, its amplitude variations cause phase changes (ΔΦ) and spectral broadening. The phase changes (ΔΦ) depend on wavelength and the modulation technique used. For a $LiNbO_3$ laser the phase variation is given, according to the equation:

$$\Delta\Phi = C \cdot \frac{\pi}{2} \cdot \frac{V_0}{V_\pi} \qquad \text{EQ2}$$

where is the modulation voltage, is the voltage for full modulation [(0,1)] or Mach Zehnder, and "C" is the chirp parameter [−1<C <+1]. These phase changes are equivalent to frequency modulation, or "chirping". Significant spectral broadening, or pulse form degradation, is observed when ΔΦ≧2.

The emergency of the ultra long haul (ULH) optical transport networks where optical signals travel long distances without regeneration, places new demands on the dispersion-limited distances. The configuration of the paths and the evolution of the network may cause existing DCEs to be inadequate, and not easy to allocate along the optical path. In addition, the existing adaptive DCEs have a slow response to a rapidly changing network.

A significant factor in the cost associated with optical transport systems is the number of regenerators (OEO) required along a given communications link within the network. It is important to increase the distance between such regenerators and to reduce their number along a given communication link. The distance between regenerators is at least in part governed by the degradation of the signal along the optical path, and such signal degradation is reflected by the Bit Error Rate (BER) value, which is the ratio between the number of erroneous bits counted at the receiver (Rx) site over the total number of received bits, over a given period of time.

In addition, known dispersion compensation techniques operate "broadband" over a set of wavelengths. Broadband dispersion compensators, in general, do not equalize the dispersion at every wavelength, therefore impacting transmission performance, particularly at the edges of the wavelength transmission window. This is mainly due to the fact that these broadband compensators do not compensate precisely for dispersion slope (SO).

There is a need for a mechanism for dynamically compensating/eliminating signal degradations in the received signal for performing channel optimization in order to achieve higher bit rates and longer transmission spans.

SUMMARY OF THE INVENTION

The present invention seeks to overcome the disadvantages of the prior art associated with signal degradation experienced by high speed optical signals.

It is an other object of the present invention to provide a method for per channel dispersion compensation using an adaptive phase prechirp mechanism.

According to one aspect of the invention, a method for optimizing quality of a data signal transmitted over an optical WDM network is provided. The method comprises the steps of generating, at a transmit site, a FEC encoded optical signal, by intensity modulating the data signal over an optical carrier; phase modulating the optical signal with a prechirp signal; transmitting the optical signal from the transmit site to a receive site; recovering the data signal from the optical signal at a receive site; determining a degradation factor indicative of the distortion suffered by the optical signal between the transmit and the receive sites; and controlling the amplitude of the prechirp signal with the degradation factor.

According to another aspect of the invention, an optical transmitter for a WDM network is provided. The transmitter comprises means for generating an optical signal by intensity modulating a data signal and launching same over an optical transmission medium; a phase modulator for phase-modulating the optical signal with a prechirp signal; a controller for receiving a signal degradation factor indicative of the degradation of the optical signal along the transmission medium and adjusting the prechirp signal accordingly.

According to a still further aspect of the invention, an optical transport system for optimizing the quality of an optical signal transmitted over an optical channel is provided. The system comprises means, at the transmitter, for modulating an optical signal with a modulation prechirp signal; means, at the receiver, for calculating a signal degradation factor and a corresponding value of the signal quality; a telemetry feedback link for feeding the signal degradation factor to the transmitter; means for modifying the prechirp signal over a predetermined range of system operation so as to obtain a plurality of prechirp levels and corresponding values of the signal quality; means for storing the plurality of prechirp levels and corresponding values of the signal quality; means for comparing and determining a maximum channel value of the signal quality, whereby an optimal channel prechirp corresponding to the maximum channel value of the signal quality is derived.

The present invention advantageously optimizes the receive end pulse shape, minimizes the BER value, and maximizes the transmission distance (L) by using a remote end feedback signal to adaptively lock-in a variable phase prechirp transmitter in order to compensate for signal degradation along the fiber. This invention can be used in conjunction with DCF, or any other dispersion compensating elements (DCE), to act as a "mop-up" dispersion compensator per wavelength channel and compensate for the residual dispersion slope of the fibre, and is useful for wavelength division multiplexing (WDM) systems carrying a plurality of waves of different wavelengths.

It is to be noted that, the dispersion tuning range according to the invention covers the worst-case scenarios for a given optical transport system and effectively compensates for signal degradation before the receiver (Rx).

The "Summary of the Invention" does not necessarily disclose all the inventive features. The invention may reside in a sub-combination of the disclosed features.

BRIEF DESCRIPTION OF THE DRAWINGS

The invention will be now explained by way of example only and with reference to the following drawings.

Similar references are used in different figures to denote similar components.

DETAILED DESCRIPTION OF THE PREFERRED EMBODIMENT

The following description is of a preferred embodiment by way of example only and without limitation to combination of features necessary for carrying the invention into effect.

The method according to the invention is based on prechirping of the signal phase at the transmitter (Tx) site for suppressing degradation of a transmission wave form due to linear and nonlinear effects in the fiber. Prechirping is a technique that can be performed by altering the phase of the optical signal, and implies imposing a controlled compensatory degradation, or induced phase prechirp. A parameter (C) as defined in EQ 2 is characteristic for the chirp associated with external modulators.

Figure 1A:
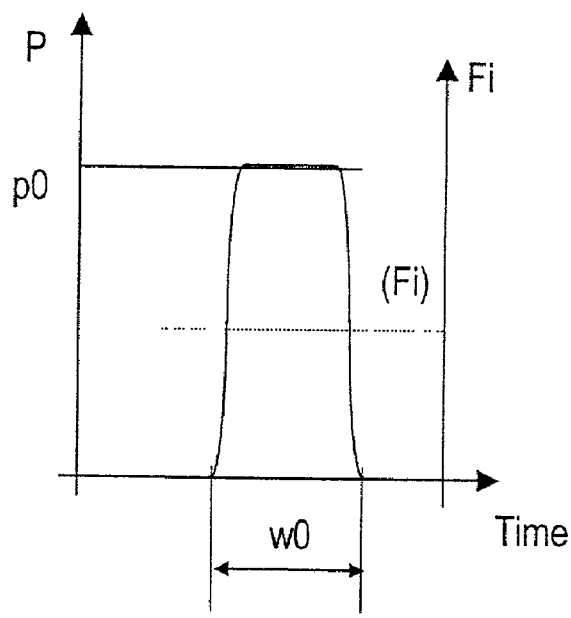
FIG. 1a illustrates an optical pulse sent without compensation over the fiber.
Figure 1B:
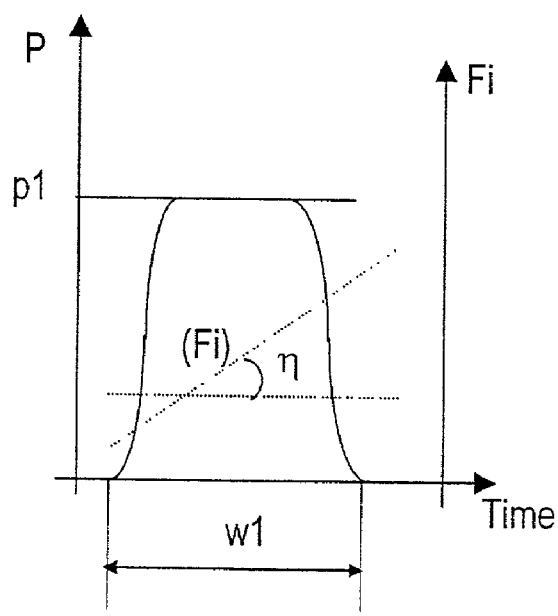
FIG. 1b illustrates the broadening of the optical pulse of FIG. 1 as received at the end of a line having positive chromatic dispersion.

FIGS. 1A and 1B described next are intended to provide a better view of the field of the invention and the current state of the art.

FIG. 1A illustrates an optical pulse po sent without compensation over the fiber. The pulse has a width "wo" and a substantially constant instantaneous frequency (Fi). When transmitted over a fiber having positive chromatic dispersion, the pulse spectrum is widened to w1>wo, and the instantaneous frequency (Fi) is not constant any more but has a slope ($\eta$) due to the dispersion undergone over the transmission line, as shown in FIG. 1B. The pulse spectrum is widened with the low frequencies at the start of the pulse, and with the high frequencies at the end of the pulse. The temporal widening of the pulse may prompt intersymbol interferences (ISI) as two consecutive pulses can disturb each other at the receive end, as discussed above.

The instantaneous frequency (Fi) variation is the result of an undesired phase modulation and is dependent on a plurality of factors like the optical power (P), the length traveled by the pulse (L), the coefficient of chromatic dispersion (D), the bit rate of the digital signal, the binary code format of the digital signal, and others.

Figure 2:
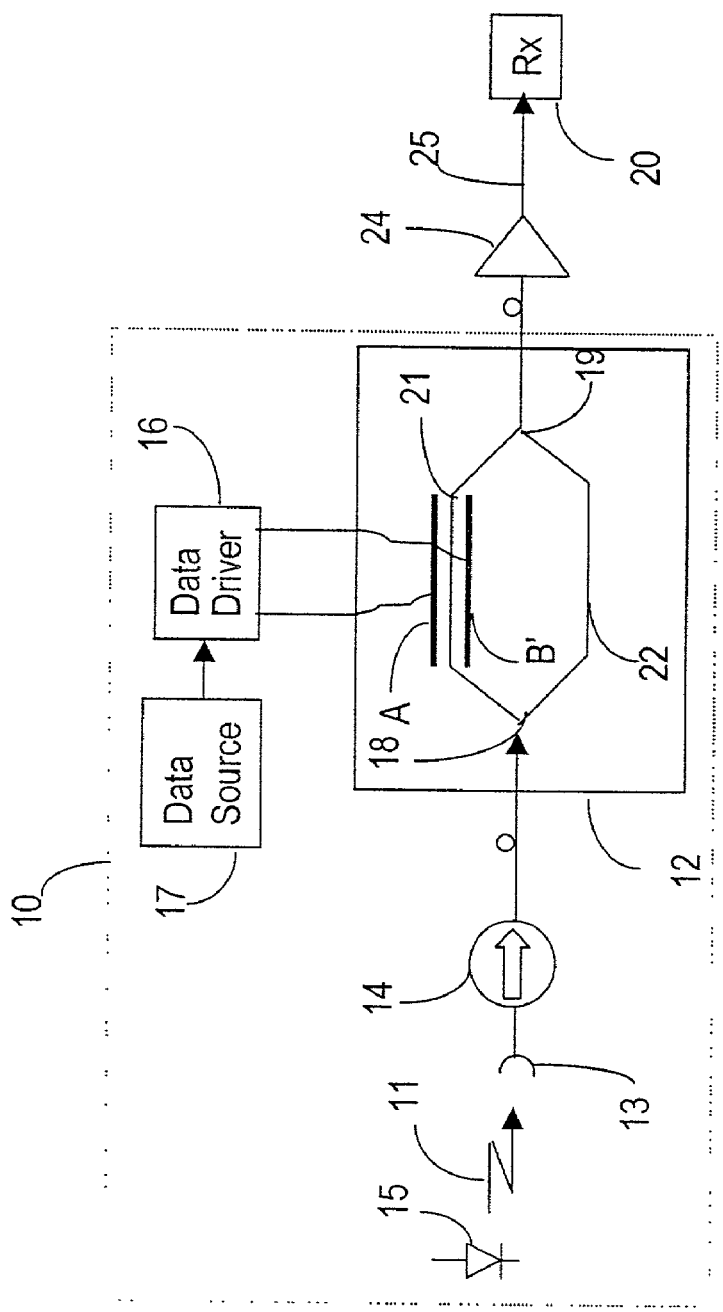
FIG. 2 is a simplified lightwave transmission system including a conventional Mach-Zender external modulator.

As illustrated in FIG. 2, a transmitter 10 generally includes an external modulator 12 receiving an optical signal 11 of a certain wavelength, namely the wavelength of the communication channel travelling from laser 15 through a lensed optical fiber 13 and an isolator 14. Data driver 16 receives the data signal from block 17 and applies it to the modulating input of modulator 12. The output of modulator 12 is an optical signal having the wavelength modulated with the data signal.

Laser 15 may be an InGaAsP/InP semiconductor laser operated in a continuous wave (CW) mode, or pulsed mode, as it is known in the art. Modulator 12 may be a lithium niobate Mach-Zender interferometer using a push-pull scheme where the drive signal is applied on modulation waveguides 21, 22. As well known, the incoming light divided by a first "Y" 18 is modulated using arms (waveguides) 21, 22, and the modulated light (see electrodes A and B) of arm 21 is combined with the unmodulated light of arm 22 by an inverse "Y" 19. The optical signal is then launched over fiber 25 for transmission to receiver 28. An optical amplifier 24 is generally provided at the output of the transmitter 10.

Modulation performed by external modulator 12 on optical signals 11 may be amplitude or phase modulation. When modulated, the pulses present somehow large and uncontrolled wavelength shifting or "chirp". Chirped pulses are severely distorted when propagated over the fiber at high bit data rates of e.g. 10 Gbps and over, thus adding to the power penalty. This is mainly due to the fact that dispersion is higher for wavelength components of a chirped pulse which are not at the low-dispersion wavelength ($\lambda_0$) even when the transmitter transmits at $\lambda_0$. Such phenomenon indirectly limits the maximum transmission length or the maximum transmission bandwidth due to ISI.

It becomes evident that the present modulators require a form of chirp compensation, or prechirp. The power penalty depends on the sign and the magnitude of the chirp and dispersion. If the signs of dispersion and chirp are opposite, pulse compression can occur.

Furthermore, Mach-Zender modulators can exhibit residual chirping, or self-chirping, due to the asymmetric field overlap between the two arms which may generate phase modulation of a transmitted optical carrier. Zero-chirp transmitters have been developed to ameliorate signal degradation caused by this phenomenon. Even for zero-chirp modulators, adaptive prechirp is required to compensate individual wavelengths and the respective dispersion. However, the modulation induced chirp was not yet consistently addressed.

It is to be noted that, if an optical modulator operates with a properly modulation induced chirp (magnitude and sign), the frequency of the light is shifted during the rising and the falling edges of the optical pulse in a compensatory way, and the dispersion penalty can be significantly reduced due to the pulse compression that occurs. In other words, the chirp parameter should be adjusted to a predetermined non-zero, compensatory level which leads to the lowest possible power penalty for the entire system.

The adaptive phase prechirp transmission system of the present invention, provides independent phase modulation over the intensity modulated optical signal for dispersion/degradation compensation.

Figure 3:
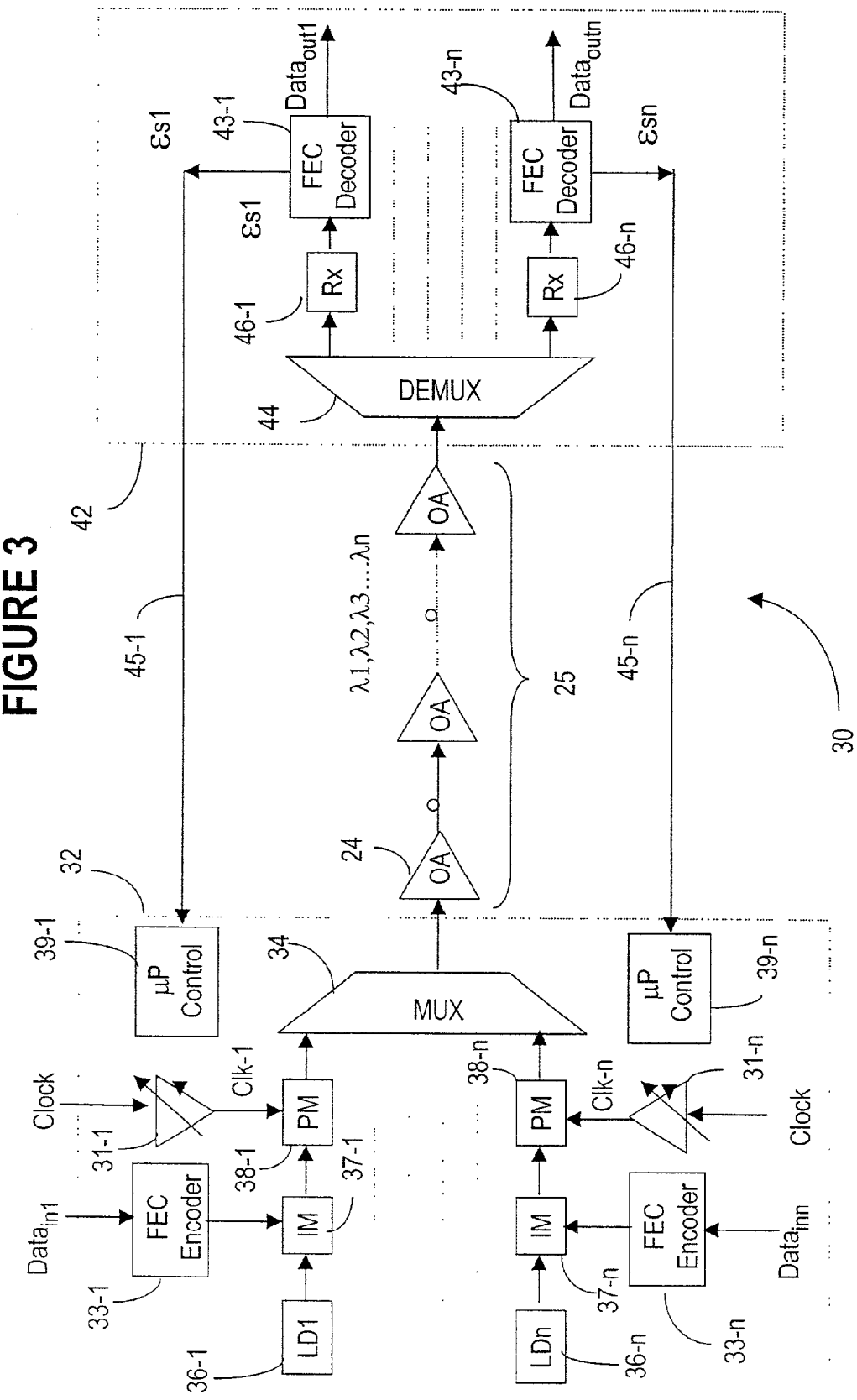
FIG. 3 is a lightwave transmission system including an adaptive phase prechirp transmitter, according to the invention.

FIG. 3 shows a lightwave transmission system according to the invention. An end-to-end communication line of an optical transport system 30 comprises transmitter (Tx) section 32, transport section 25 and receiver (Rx) section 42. At the transmitter (Tx) section 32, each channel is provided with a light source, e.g. a laser diode 36-1 to 36-n for generating the optical carrier signal. Electro-optical intensity modulators (IM) 37-1 to 37-n modulate the information signal [$Data_{in-1}$ $Data_{in-2}$ . . . $Data_{in-n}$] over each respective carrier wavelength ($\lambda_1$ $\lambda_2$ . . . $\lambda_n$). As usual, modulation signals [Data$_{in-1}$ Data$_{in-2}$ ... Data$_{in-n}$] are FEC encoded by blocks 33-1 to 33-n. A Mach Zehnder modulator may be used as IM 37-1 to 37-n.

It is known to generate a control code at the transmission (Tx) site which travels with the signal along the optical path and suffers similar degradation. The error detection function is based on comparing the transmitted and received control codes and may use various algorithms to compensate for specific errors and to provide an error count. This method is called forward error correction (FEC).

Each intensity modulated channel is further phase chirped with phase modulators (PM) 38-1 to 38-n connected to the output of intensity modulators (IM) 37-1 to 37-n. Phase modulators 38-1 to 38-n may be individually controlled with clock signals [CLK$_1$ ... CLK$_n$], and variable gain amplifiers 31-i, as it will be explained later. The prechirped channels are thereafter input to multiplexer 34 for combining the channels ($\lambda_1$ $\lambda_2$ ... $\lambda_n$) into a WDM optical signal and transmitting it over transport section 25.

At the receiver (Rx) section 42, channels ($\lambda_1, \lambda_2, \ldots \lambda_n$) are separated from the WDM signal by demultiplexer 24 and routed to receivers (Rx) 46-1 to 46-n for conversion (demodulation) to an electrical signal. FEC decoders 43-1 to 43-n restore the information signal [Data$_{out1}$ ... Data$_{outn}$] based on the FEC code received with the signal from the transmitter (Tx) section 32. The adaptive phase prechirp transmission system 30, has the ability to quantify a signal degradation factor that takes into account chromatic dispersion (CD), non-linear effects, self-chirping, etc., occurring during operation of the transmitter in order to determine the system's optimal phase prechirp level. The signal degradation factor can be derived from measurements of various signal characteristics including: the eye pattern, the BER, the Quality of Signal (Q), etc.

If the degradation factor is based on Q measurement, or the electrical signal-to noise rate (SNR), the phase prechirp level may be deliberately varied to find an optimum point for the measured transmission characteristic Q.

The channel receiver (Rx) Q value is expressed using the signal level (amplitude) difference between emission ($\mu_1$ at level 1) and non-emission ($\mu_0$ at level 0) as the numerator, and the sum of the standard deviations of noise during emission ($\sigma_1$ at level 1) and non-emission ($\sigma_0$ at level 0) as the denominator, or $$Q = \frac{\mu_1 - \mu_0}{\sigma_1 + \sigma_0} \quad \text{EQ3}$$

The degradation factor may be also determined by measuring the BER. There is a strict dependency between Q and the BER such that, for a noise Gaussian distribution the BER given by the Q value agrees with the minimum value of the actually measured BER.

The implementation of a FEC function allows in-line monitoring of the BER before correction (BER$_{input}$). The forward error correction code reports the evolution of the line errors while keeping the system faultless by correcting these errors in the output data [Data$_{out1}$ ... Data$_{outn}$]. Thus, an evaluation relative to the required level of performance is always available at the receiver (Rx) section 32 allowing the adaptive phase prechirp transmission system 30 to initiate the necessary action before any effective degradation of the signal. It is to be noted that, the signal quality (Q) can always be calculated from FEC corrected errors, even when BER$_{out}$ is zero.

In the implementation of FIG. 3 the sum of the corrected bits ($\Sigma_{corrected\ errors} = \epsilon_{si}$ for the $\lambda_i$ channel) over a predefined period of time, e.g. 1 sec, is measured and referred to as the signal degradation factor ($\epsilon_{si}$).

The signal degradation factor ($\epsilon_{si}$) is used as a remote end feedback signal to control the phase prechirp value. The signal degradation factor ($\epsilon_{si}$) gives a good indication of the signal quality (Q), even if there are no errors on the data output [Data$_{out1}$ ... Data$_{outn}$] at the receiver (Rx) end.

The quality characteristics of a signal may be brought to an optimal point by considering signal deterioration being the result of a composite degradation factor accumulated over the optical path. The phase magnitude of an external phase modulator is adjusted at the transmit end based on the measured BER value at the receive end, as $\epsilon_{si}$ is provided as an output of the FEC decoder ASIC.

The signal degradation factor ($\epsilon_{si}$) is fed back to transmitter (Tx) section 32 as a chirp control signal, via telemetry feedback links 45-1 to 45-n. The optical supervisory channel (OSC) may be used for this purpose, or any other communication channel, e.g. WAN connection from Rx to Tx. Alternatively, the digital communication channel (DCC) provided in the data channel overhead for the corresponding reverse channel, may transport the signal degradation factor ($\epsilon_{si}$) from the Rx section 42 to the Tx section 32.

As shown in FIG. 3, degradation factor ($\epsilon_{si}$) is input to microprocessors 39-i at the Tx section 32, which controls modulation of a corresponding phase modulator (PM) 38-i. The magnitude of the phase modulation signal is controlled by changing the drive amplifier 38-i gain, e.g. the peak to peak phase $\Phi_{pk-pk}$. The phase modulator (PM) 38-i could be implemented using a single-ended LiNbO$_3$ linear waveguide which electro-optically provides "$\Phi_{pk-pk}$" for a voltage applied by the variable gain electrical amplifier 31-i and performs channel independent phase modulation.

An alternative implementation may use a single MZ configuration where a differential "push-pull" input is used for intensity modulation (IM), and a common electrical drive "push-push" provides pure phase modulation (PM).

Figure 4:
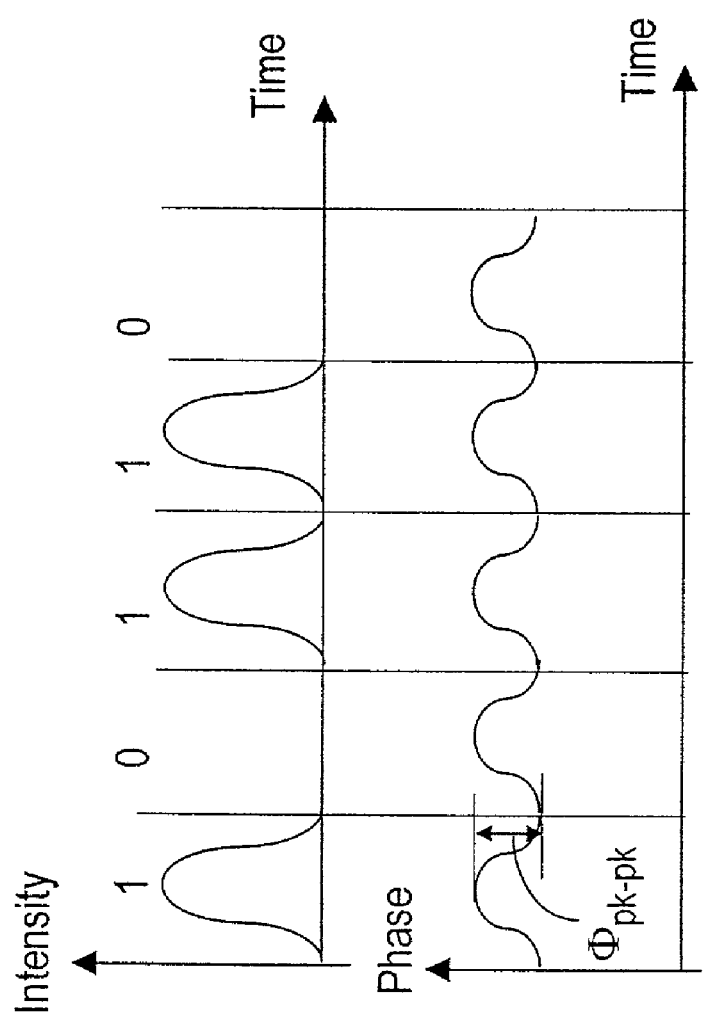
FIGS. 4 is a graph illustrating a sinusoidal prechirp phase modulation signal (phase prechirp) synchronized with a data signal.

FIG. 4 is a graph illustrating a sinusoidal phase modulation signal having a peak-to-peak value $\Phi_{pk-pk}$ synchronized with a digital data signal comprising a binary sequence [10110]. The digital data sequence is coded in return to zero mode (RZ) but any other code may be considered, e.g the non-return to zero (NRZ) mode. The chirp is a frequency value for shifting the edges of the pulse $$\Delta f = \frac{\delta \Phi}{\delta t}.$$

The value $\Phi_{pk-pk}$ is controlled by adjusting the gain of the phase modulator drive amplifier 31-i based on the degradation factor $\epsilon_{si}$.

Figure 5:
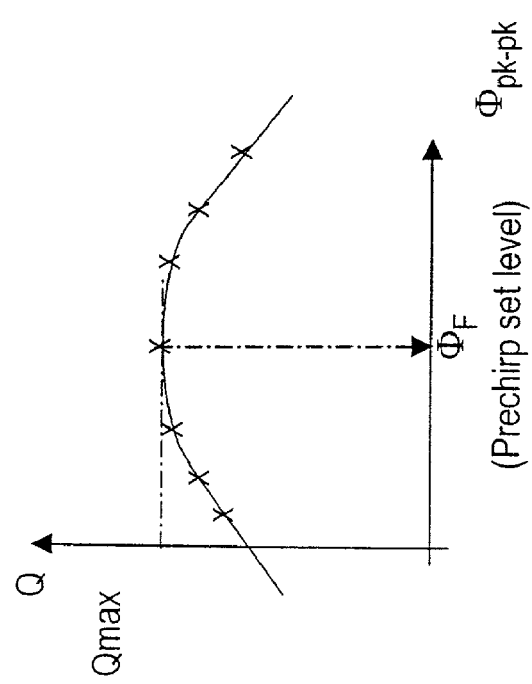
FIG. 5 is a ($\Phi_{pk-pk}$;Q) graph illustrating how the system's optimal phase prechirp level is set at the transmitter (Tx) site.

FIG. 5 is a ($\Phi_{pk-pk}$;Q) graph illustrating how the system optimal phase prechirp value is set at the transmitter (Tx) site 32 of FIG. 3. The prechirp modulation signal $\Phi_{pk-pk}$ values are swept over a range of system operation covering the worst-case signal degradation limits for the optical transport system 30. For each sweeping, Q is inferred from FEC corrected errors. The measurements are recorded on the graph and the optimal phase prechirp level is set at $\Phi_F$, or point F, corresponding to Q$_{max}$. According to the fiber quality and design, each optical transport system 30 has unique characteristics and therefore, the optimal phase prechirp $\Phi_F$ varies with the channel and the system.

The optimal phase prechirp $\Phi_F$ is preferably locked to a fixed transmit wavelength for the life of the system 30 as the fiber dispersion and signal degradation do not vary greatly over the system lifetime. This may occur at system installation and thereafter system 30 operates in an open loop over its life time, without using telemetry feedback link 45-i. However, system 30 may operate in closed-loop over its timelife, or for a predetermined period of time, as long as the telemetry feedback lines 45-1 to 45-n remain available.

In such a case, the optimal prechirp allows for correction of drifts in temperature, fiber aging, etc.

Figure 6:
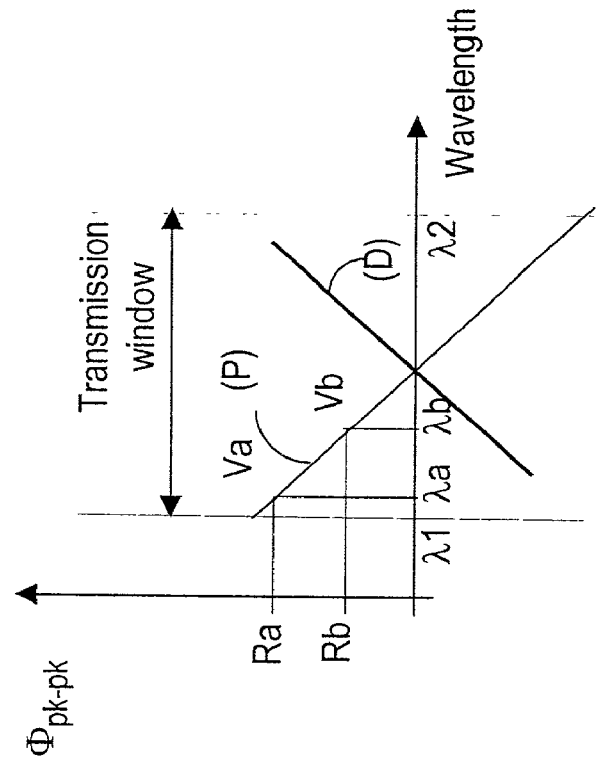
FIG. 6 is a graph illustrating per channel phase prechirp optimization.

FIG. 6 is a graph illustrating how the phase prechirp values can be optimized on a per channel basis. Phase prechirp values, line P, are variable in the transmission window $\lambda_1$–$\lambda_2$ as illustrated for points Va and Vb defined by $\lambda_a < \lambda_b$, and corresponding residual dispersion slopes Ra>Rb. It is apparent that line P has a complementary slope to dispersion line D.

The phase prechirp value can be tuned for each wavelength individually, and the eye shape of the transmit wave can be optimized independent of the net link dispersion. The phase prechirp does not change the eye shape. The phase prechirp changes the frequency, (the phase) of the pulse edge.

The nominal dispersion slope (So) is given by equation:

$$D(\lambda) = So(\lambda - \lambda_0), \quad \text{EQ 4}$$

So is generally set at –0.093≈–0.1 ps/nm Km for $\lambda_{o\,min} = 1{,}300$ nm, $\lambda_{o\,MAX} = 1{,}324$ nm, for SMF-28 fiber type.

Figure 7:
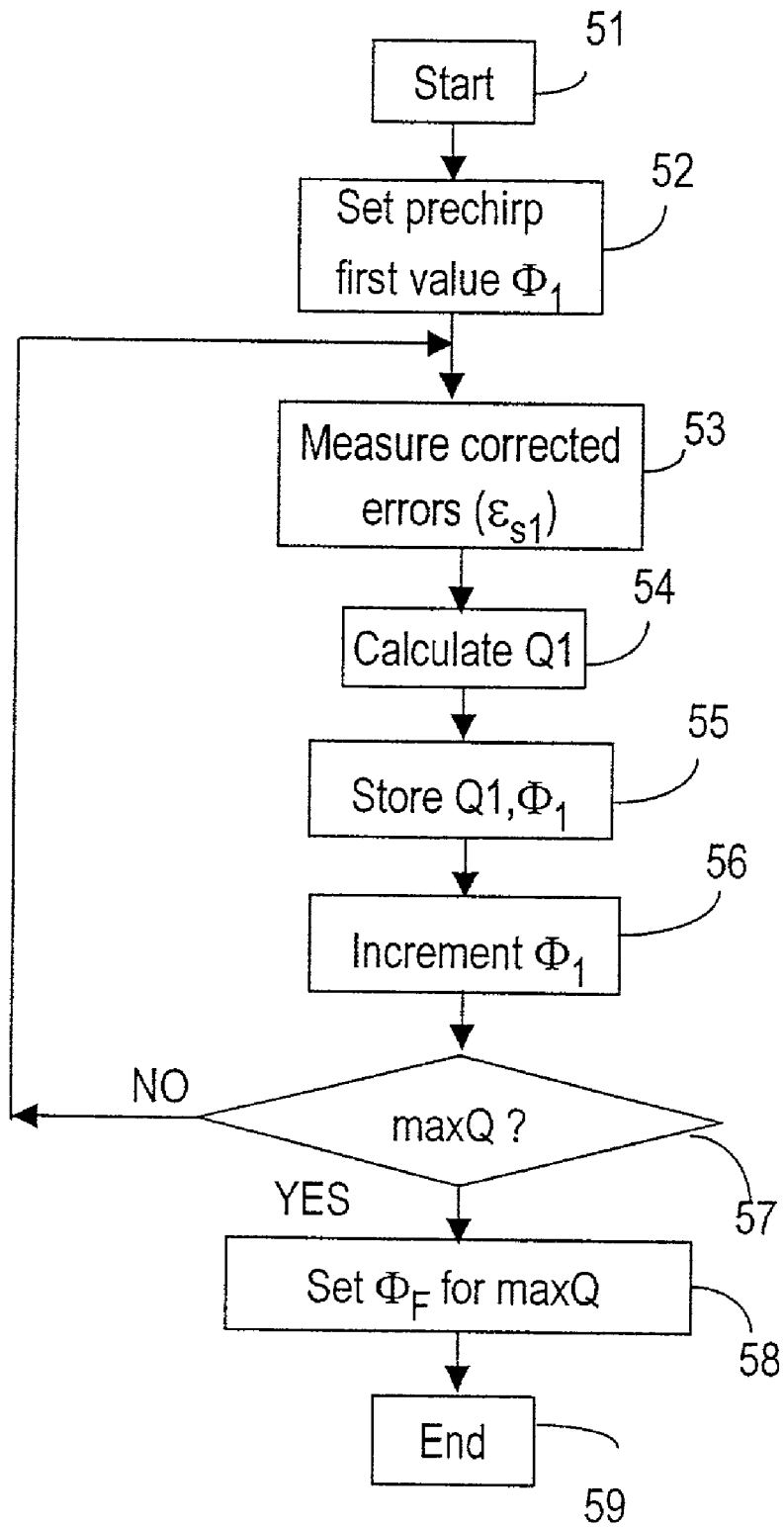
FIG. 7 is a flow chart illustrating the steps of the lock-in phase prechirp method according to one embodiment of the invention.

FIG. 7 is a flow chart illustrating the steps of a lock-in phase prechirp method according to one embodiment of the invention. The process starts at step 51. Initially, the phase prechirp level is set to $\Phi_1$ and the corrected errors are summed to generate a signal degradation factor ($_{esi}$), step 53. Q is calculated from the BER values, step 54, and paired values $[\Phi_1; Q_1]$ are stored, step 55. The value of $\Phi_1$ is incremented, step 56, and if $Q_{max}$ is not found, step 57, steps 53 to 57 are repeated until the graph of FIG. 5 is obtained and $Q_{max}$ is found. At step 58, the optimal system's phase prechirp level ($\Phi_F$) corresponding to $Q_{max}$ is determined and the process ends, step 59. As discussed before, $\Phi_F$ may be locked in for life; alternatively, system 30 may operate in closed loop to provide an adaptive phase prechirp optimal level ($\Phi_F$), as long as lines 45-1 to 45-n remain available.

In a similar way, channels ($\lambda_1, \lambda_2, \ldots \lambda_n$) may be optimized to identify the optimal channel phase prechirp level ($\Phi_{Ci}$) to compensate for the residual dispersion slope on a per channel basis.

As mentioned before, the method is designed to cover the range of system operation including the anticipated worst-case signal degradation scenarios. The iterative method according to one embodiment of the invention, employs a convergence scheme that initially identifies the signal quality (Q) variations based on phase prechirp settings. Subsequent phase prechirp settings are selected with the knowledge of the trends in system/channel signal quality (Q), such that a significantly reduced number of settings are required to determine the optimal phase prechirp level.

The invention could be applied to networks equiped with photonic crossconnect (PXC) switches. In such a case, the end-to-end net link dispersion changes after each switch, due to the optical transparency of the PXC switch. Accordingly, the phase prechirp value has to be calculated and "re-locked" after each link between any two successive switches along the optical path, as the source to destination optical path includes now links with different signal degradation factors.

Phase prechirp can be "programmed" to link length when PXC switches are used. In this case, Q is measured at each intermediate destination site, and the signal degradation factor is fed back from the intermediate site to the respective source transmit (Tx) site. The lock-in phase prechirp optimization procedure is performed for each added link, and each intermediate sub-system considered is optimized in relation to the respective Tx site.

This method provides more flexibility when using optical switching in core networks, as it allows path optimization to new physical link connectivity, without requiring any change to the optical components, e.g. the dispersion compensating elements (DCE).

The present invention provides a significant signal degradation tuning range for a WDM optical transport system. An iterative process is used to set the phase prechirp to a system's optimal level that maximizes the signal quality ($Q_{max}$). The signal degradation factor ($_{esi}$) takes into account linear and non-linear effects along the optical path and is used as a receive (Rx) end feedback signal to control the phase prechirp level at the transmitter (Tx) site. By using the FEC corrected errors rate as a feedback signal, optimization of Q is possible even when the system is running error free. Using an adaptive phase prechirp transmitter, signal degradation compensation can be also performed on a per wavelength basis to compensate for the residual dispersion slope and to allow optimization of individual channels independently of the net link dispersion value.

Numerous modifications, variations, and adaptations may be made to the particular embodiments of the invention without departing from the scope of the invention which is defined in the claims.

The invention claimed is:

1. A method for optimizing quality of a data signal transmitted over an optical WDM network, comprising:

generating, at a transmit site, a FEC encoded optical signal, by intensity modulating said data signal over an optical carrier;

phase modulating said optical signal with a prechirp signal;

transmitting said optical signal from said transmit site to a receive site;

recovering said data signal from said optical signal at a receive site;

determining a degradation factor indicative of the distortion suffered by said optical signal between said transmit and said receive sites by comprises FEC decoding said optical signal and counting the number of errors corrected in said optical signal; and controlling the amplitude of said prechirp signal with said degradation factor by transmitting said degradation factor from said receive site to said transmit site;

processing said degradation factor into a control signal corresponding to an optimal prechirp, wherein said optimal prechirp is determined according to a Q versus prechirp graph provided by measuring the quality factor Q of said optical signal at said receive site for a plurality of given prechirp levels, and selecting said optimal prechirp associated with a maximum Q on said graph; and synchronizing said control signal with said optical signal.

2. A method as claimed in claim 1, wherein said phase modulating step includes modulating said optical signal with an independent phase modulation signal over the intensity modulation signal.

3. A method as claimed in claim 1, wherein said degradation factor is transmitted over a telemetry feedback link.

4. A method as claimed in claim 1, wherein said degradation factor is transmitted over an optical service channel.

5. A method as claimed in claim 1, wherein said degradation factor is transmitted over a data communication channel.

6. A method as claimed in claim 1, further comprising storing said optimal prechirp in a memory.

7. A method as claimed in claim 6, wherein said optimal prechirp is used for the life of said optical signal.

8. A method as claimed in claim 7, wherein said optimal prechirp is reassessed as desired during the life of said optical signal.

9. A method as claimed in claim 1, wherein said receive site is a first optical switch, and said optimal prechirp is used to optimize transmission of said optical signal between said transmitter and said first optical switch.

10. A method as claimed in claim 9, wherein said transmit site is a first optical switch and said receive site is a second optical switch, and said optimal pre-chirp is used to optimize transmission of said optical signal between said first optical switch and said second optical switch.

11. A method as claimed in claim 9, wherein said transmit site is an optical switch site, and said optimal prechirp is used to optimize transmission of said optical signal between said optical switch and said receive site.

12. A method for optimizing quality of a plurality of data signals transmitted over an optical WDM network, comprising, for each data signal:
generating, at a transmit site, a respective FEC encoded optical signal, by intensity modulating a respective data signal over an associated optical carrier;
phase modulating said respective optical signal with a respective prechirp signal;
transmitting said respective optical signal from said transmit site to a receive site;
recovering said respective data signal from said respective optical signal at said receive site;
determining a respective degradation factor indicative of the distortion suffered by said respective data signal between said transmit and said receive sites by
modifying said prechirp signal over a predetermined range of system operation so as to obtain a plurality of prechirp levels and corresponding values of signal guality;
storing said plurality of prechirp levels and corresponding values of said signal quality;
comparing and determining a maximum channel value of said signal guality, whereby an optimal channel prechirp corresponding to said maximum channel value of said signal quality is derived; and
controlling the amplitude of said respective prechirp signal with said degradation factor.

13. A method as claimed in claim 12, wherein said step of transmitting includes multiplexing all said respective optical signals into a WDM signal at said transmit site, launching said WDM signal towards said receive site and demultiplexing said WDM signal at said receive site to obtain said respective optical signals.

14. A method as claimed in claim 12 wherein said step of determining a degradation factor comprises FEC decoding each said respective optical signal and counting a respective number of errors corrected in each said data signal.

15. A method as claimed in claim 14, wherein controlling the amplitude of said prechirp signal comprises:
transmitting each said respective degradation factor from said receive site to said transmit site;
processing each said respective degradation factor into a respective control signal of an optimal prechirp; and
synchronizing said respective control signal with said respective optical signal.

16. A method as claimed in claim 15, wherein each said respective degradation factor is transmitted over a respective telemetry feedback link.

17. An optical transport system for optimizing the quality of an optical signal transmitted over an optical channel, comprising:
means, at the transmitter, for modulating an optical signal with a modulation prechirp signal;
means, at the receiver, for calculating a signal degradation factor and a corresponding value of said signal quality;
a telemetry feedback link for feeding said signal degradation factor to the transmitter;
means for modifying said prechirp signal over a predetermined range of system operation so as to obtain a plurality of prechirp levels and corresponding values of said signal quality;
means for storing said plurality of prechirp levels and corresponding values of said signal quality;
means for comparing and determining a maximum channel value of said signal quality,
whereby an optimal channel prechirp corresponding to said maximum channel value of said signal quality is derived.

18. The system of claim 17, further comprising processing means for receiving said degradation factor and for outputting a signal to control said prechirp level responsive to said signal degradation factor.

19. The system of claim 17, wherein said signal degradation factor is the sum of FEC corrected errors over a period of time.

20. The system of claim 19, wherein said errors are calculated by monitoring a timing jitter for a non return to zero (NRZ) transmission mode.

21. The system of claim 19, wherein said errors are calculated by monitoring the dispersed energy between pulses for a return to zero (RZ) transmission mode.

22. The system of claim 17, wherein said telemetry feedback link is used only during installation and said optimal channel prechirp level is locked in for the life of said system.

23. The system of claim 17, wherein said prechirp signal is a sinusoidal signal synchronized with the system clock.

24. The system of claim 17, wherein said optimal channel prechirp compensates for dispersion slope at each wavelength independently of the net link dispersion.

25. The system of claim 17, wherein said optical transport system is a WDM system.

26. The system of claim 17, wherein said predetermined range of system operation covers all worst-case degradation limits.

* * * * *